United States Patent
Lee et al.

(10) Patent No.: US 11,919,424 B2
(45) Date of Patent: Mar. 5, 2024

(54) ROTARY SEAT DEVICE FOR VEHICLE

(71) Applicant: HYUNDAI TRANSYS INC., Seosan-si (KR)

(72) Inventors: Jae Sung Lee, Yongin-si (KR); Eom Seok Yoo, Hwaseong-si (KR); Byung Mo Kim, Suwon-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/811,929

(22) Filed: Jul. 12, 2022

(65) Prior Publication Data

US 2023/0020082 A1    Jan. 19, 2023

(30) Foreign Application Priority Data

Jul. 13, 2021   (KR) .......................... 10-2021-0091478

(51) Int. Cl.
*B60N 2/14*   (2006.01)
*B60N 2/06*   (2006.01)

(52) U.S. Cl.
CPC .................. *B60N 2/14* (2013.01); *B60N 2/06* (2013.01)

(58) Field of Classification Search
CPC ..................................... B60N 2/14; B60N 2/06
See application file for complete search history.

(56) References Cited

U.S. PATENT DOCUMENTS

| | | | | |
|---|---|---|---|---|
| 6,557,919 B2* | 5/2003 | Suga | ...................... | B60N 2/146 297/344.21 |
| 6,572,172 B1* | 6/2003 | Ninomiya | ................ | B60N 2/14 297/344.23 |
| 7,422,264 B1* | 9/2008 | Lung | ........................ | B60N 2/06 296/65.01 |
| 9,010,861 B2* | 4/2015 | Seibold | ..................... | B60N 2/14 297/344.21 |
| 10,040,373 B2* | 8/2018 | Rawlinson | ............... | B60N 2/07 |
| 10,549,654 B2* | 2/2020 | Duhamel | ........... | B60N 2/02246 |

(Continued)

FOREIGN PATENT DOCUMENTS

| | | |
|---|---|---|
| DE | 69930465 T2 | 6/2003 |
| DE | 102018210515 A1 | 1/2020 |

(Continued)

OTHER PUBLICATIONS

Korean Office Action dated Oct. 18, 2022; Appln. No. 10-2021-0091478.

(Continued)

*Primary Examiner* — Philip F Gabler

(57) ABSTRACT

The disclosure includes a first upper rail coupled to a first lower rail so as to be movable in the forward-backward direction, a second upper rail coupled to a second lower rail, which is disposed parallel to the first lower rail, so as to be movable in the forward-backward direction, drive motors respectively provided at the first upper rail and the second upper rail, a first rotation guide coupled to the first upper rail and provided with a first gear having a plurality of gear teeth, a second rotation guide coupled to the second upper rail and provided with a first gear having a plurality of gear teeth, and a seat cushion provided with second gears engaged with the first gears and configured to rotate when the first upper rail and the second upper rail move in opposite directions.

7 Claims, 6 Drawing Sheets

(56) References Cited

U.S. PATENT DOCUMENTS

| | | | | |
|---|---|---|---|---|
| 11,001,169 B2* | 5/2021 | Jang | ............ | B60N 2/14 |
| 2014/0138997 A1* | 5/2014 | Schulz | ............ | B60N 2/07 |
| | | | | 297/344.24 |
| 2022/0332223 A1* | 10/2022 | Ito | ............ | B60N 2/02253 |

FOREIGN PATENT DOCUMENTS

| | | | |
|---|---|---|---|
| JP | 3298518 | B2 | 7/2002 |
| JP | 2009149219 | A | 7/2009 |
| JP | 2019089453 | A | 6/2019 |
| KR | 1020200021618 | A | 3/2020 |
| KR | 102190069 | B1 | 12/2020 |
| KR | 1020210081773 | A | 7/2021 |

OTHER PUBLICATIONS

German Office Action dated Mar. 24, 2023; Appln. No. 10 2022 117 468.9.

Korean Decision to Grant dated Apr. 10, 2023; Appln. No. 10-2021-0091478.

\* cited by examiner

ROTARY SEAT DEVICE FOR VEHICLE

This application claims the benefit of Korean Patent Application No. 10-2021-0091478 filed on Jul. 13, 2021, the entireties of which are incorporated herein by reference.

BACKGROUND

(a) Technical Field

The present disclosure relates to a rotary seat device for a vehicle, and more particularly to a rotary seat device for a vehicle, which enables rotation of a seat for communication between occupants in the vehicle while the vehicle is driven in an autonomous driving mode.

(b) Background Art

In general, a seat for a vehicle is mainly disposed so as to face forwards, and employs a structure capable of moving only in the forward-backward direction.

However, a seat for some models of sport utility vehicles (SUVs) or recreational vehicles (RVs) is provided with a seat-rotating device, which enables the seat to rotate to a desired angle in the clockwise or counterclockwise direction, and thus is capable of being disposed so as to face in a desired direction.

However, this seat-rotating device is applied to very few models of SUVs or RVs. Particularly, the seat-rotating device is applied only to a rear seat of a vehicle, rather than a driver's seat and a front passenger seat. Thus, markets related to seat-rotating devices are not active.

However, because autonomous vehicles that do not require any manual control or intervention by drivers have recently been actively researched and developed, it is expected that vehicles will be utilized as mobile living spaces as well as transportation means. Therefore, seat-rotating devices are drawing attention as essential technology for improving the use of indoor space in vehicles.

In the case of autonomous vehicles, it is necessary to apply seat-rotating devices to a driver's seat and a front passenger seat as well as a rear seat. In particular, various components, such as forward-backward movement rails and drive motors for moving the seats along the forward-backward movement rails in a motorized manner, are mounted to the driver's seat and the front passenger seat. Therefore, there is a need to develop a seat-rotating device having a compact structure and improved durability.

The above information disclosed in this Background section is only for enhancement of understanding of the background of the invention and therefore it may contain information that does not form the related art that is already known in this country to a person of ordinary skill in the art.

SUMMARY OF THE DISCLOSURE

The present invention has been made in an effort to solve the above-described problems associated with the related art, and it is an object of the present invention to provide a rotary seat device for a vehicle, in which drive motors, which are respectively provided at a pair of rails disposed parallel to each other, are individually controlled such that the rails are independently moved forwards and backwards in opposite directions, and the two opposite sides of a seat are moved in association with the movement of the rails, thereby enabling the seat to be rotated to a predetermined angle both in the clockwise direction and in the counterclockwise direction and making it possible to improve convenience of use of the seat in the confined indoor space in an autonomous vehicle, such as for multi-party meetings and conversations, viewing the scenery, or assistance in getting in and out of the vehicle without interference with parts peripheral to the seat.

In one aspect, the present invention provides a rotary seat device for a vehicle, including a first upper rail coupled to a first lower rail so as to be movable in the forward-backward direction, a second upper rail coupled to a second lower rail, which is disposed parallel to the first lower rail, so as to be movable in the forward-backward direction, drive motors respectively provided at the first upper rail and the second upper rail, a first rotation guide coupled to the first upper rail and provided with a first gear having a plurality of gear teeth, a second rotation guide coupled to the second upper rail and provided with a first gear having a plurality of gear teeth, and a seat cushion provided with second gears engaged with the first gear of the first rotation guide and the first gear of the second rotation guide and configured to rotate when the first upper rail and the second upper rail move in opposite directions.

In a preferred embodiment, the second gears may be formed in an arc shape so as to correspond to the rotation trajectory of the seat cushion about a center axis.

In another preferred embodiment, the first gear of the first rotation guide and the first gear of the second rotation guide may be disposed so as to face each other, and may be located at different positions separated from each other in an oblique direction so as to correspond to the shapes of the second gears.

In still another preferred embodiment, the seat cushion may rotate in the clockwise direction or in the counterclockwise direction when the first upper rail moves forwards and the second upper rail moves backwards or when the second upper rail moves forwards and the first upper rail moves backwards.

In yet another preferred embodiment, the seat cushion may rotate 10° to 15° degrees about the center axis in the inward direction or in the outward direction of the vehicle.

In still yet another preferred embodiment, the first rotation guide and the second rotation guide may be provided with latching pieces protruding therefrom, and the seat cushion may be provided with fixing portions formed to be caught by the latching pieces.

In a further preferred embodiment, each of the fixing portions may have a U-shaped cross-section with an end portion caught by a corresponding one of the latching pieces, and the end portion may be formed in an arc shape so as to correspond to the shape of a corresponding one of the second gears.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
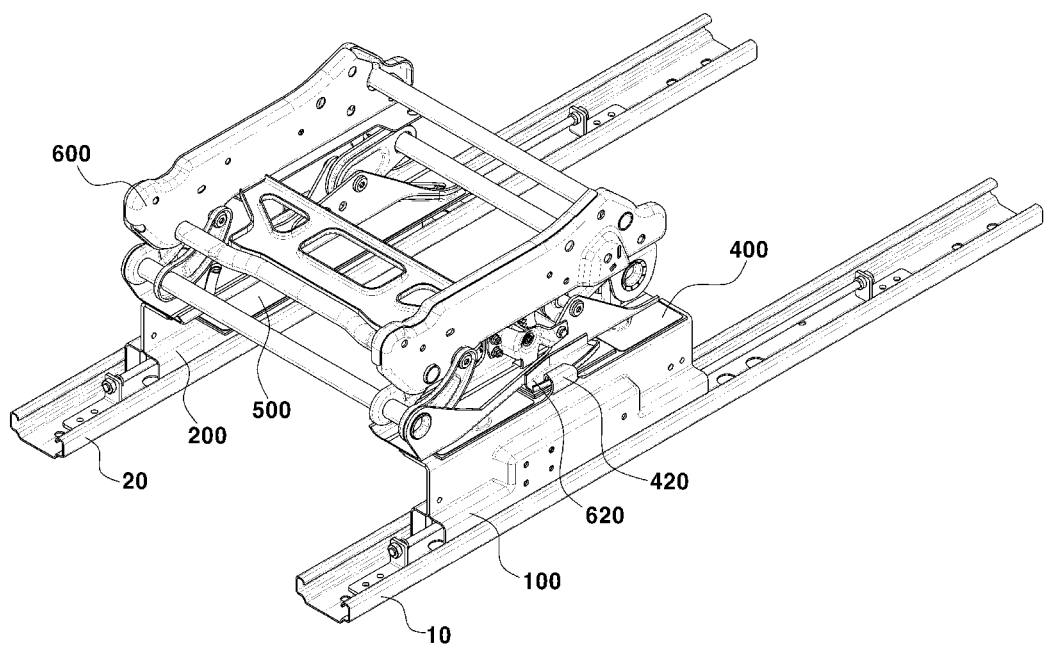
FIG. 1 is a view showing a rotary seat device for a vehicle according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below.

Advantages and features of the present invention and methods for achieving them will be made clear from embodiments described below in detail with reference to the accompanying drawings.

The present invention may, however, be embodied in many different forms, and should not be construed as being limited to the embodiments set forth herein. Rather, these embodiments are provided so that this disclosure will be thorough and complete, and will fully convey the scope of the invention to those skilled in the art. The present invention is defined only by the scope of the claims.

In the following description of the present invention, a detailed description of known functions and configurations incorporated herein will be omitted when the same may make the subject matter of the present invention rather unclear.

Figure 2:
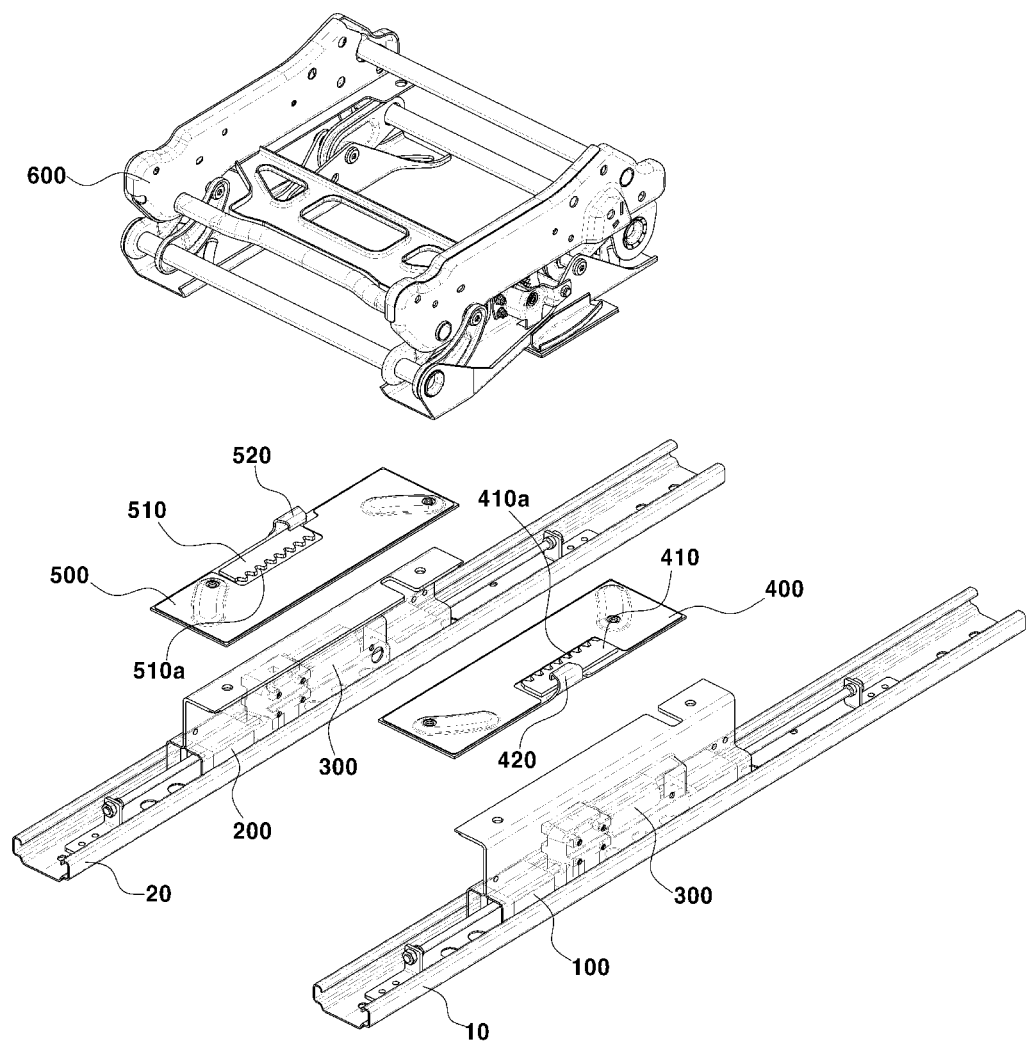
FIG. 2 is an exploded perspective view showing the structure of the rotary seat device for a vehicle according to the embodiment of the present invention.
Figure 3:
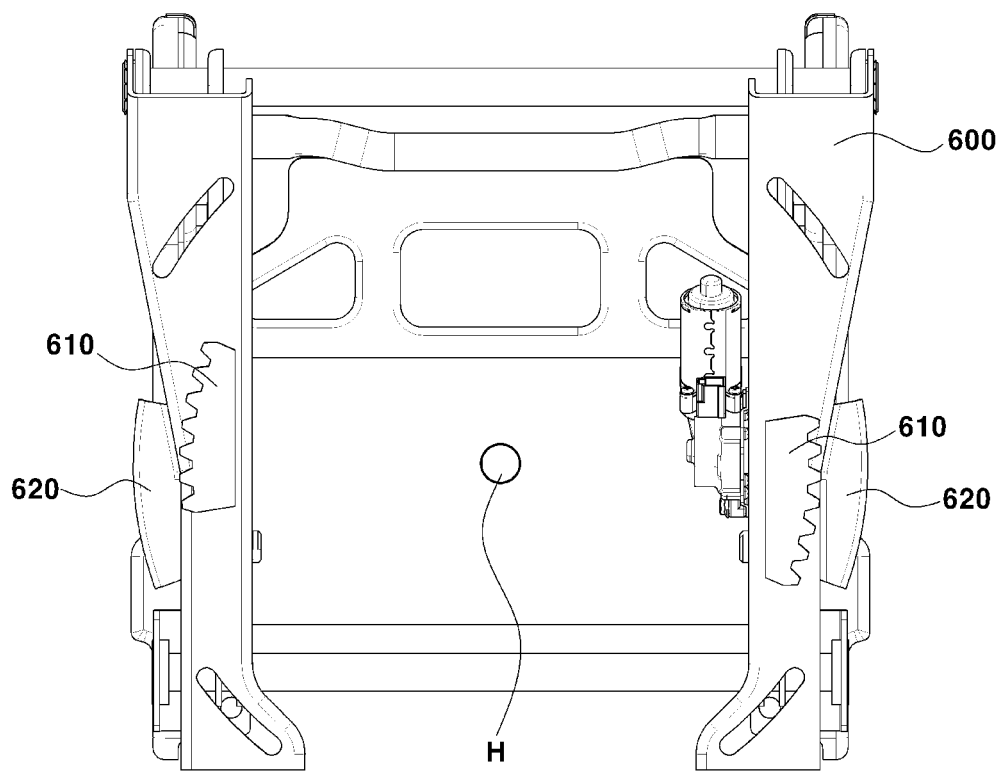
FIG. 3 is a view showing a seat cushion of the rotary seat device for a vehicle according to the embodiment of the present invention.

FIG. 1 is a view showing a rotary seat device for a vehicle according to an embodiment of the present invention, FIG. 2 is an exploded perspective view showing the structure of the rotary seat device for a vehicle according to the embodiment of the present invention, and FIG. 3 is a view showing a seat cushion of the rotary seat device for a vehicle according to the embodiment of the present invention.

Figure 4:
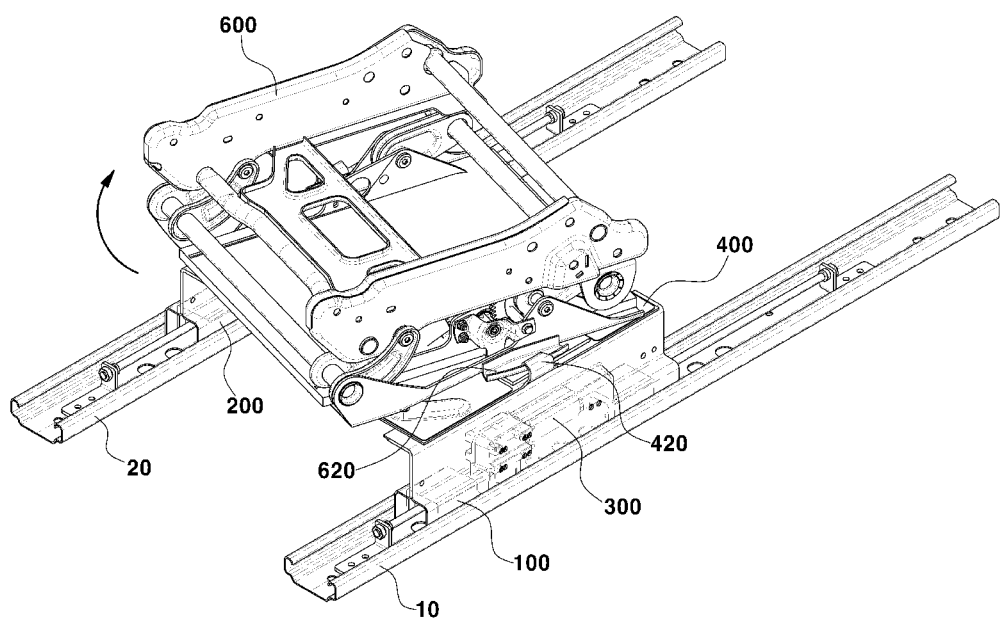
FIG. 4 is a view showing rotation of the seat cushion of the rotary seat device for a vehicle according to the embodiment of the present invention.
Figure 5:
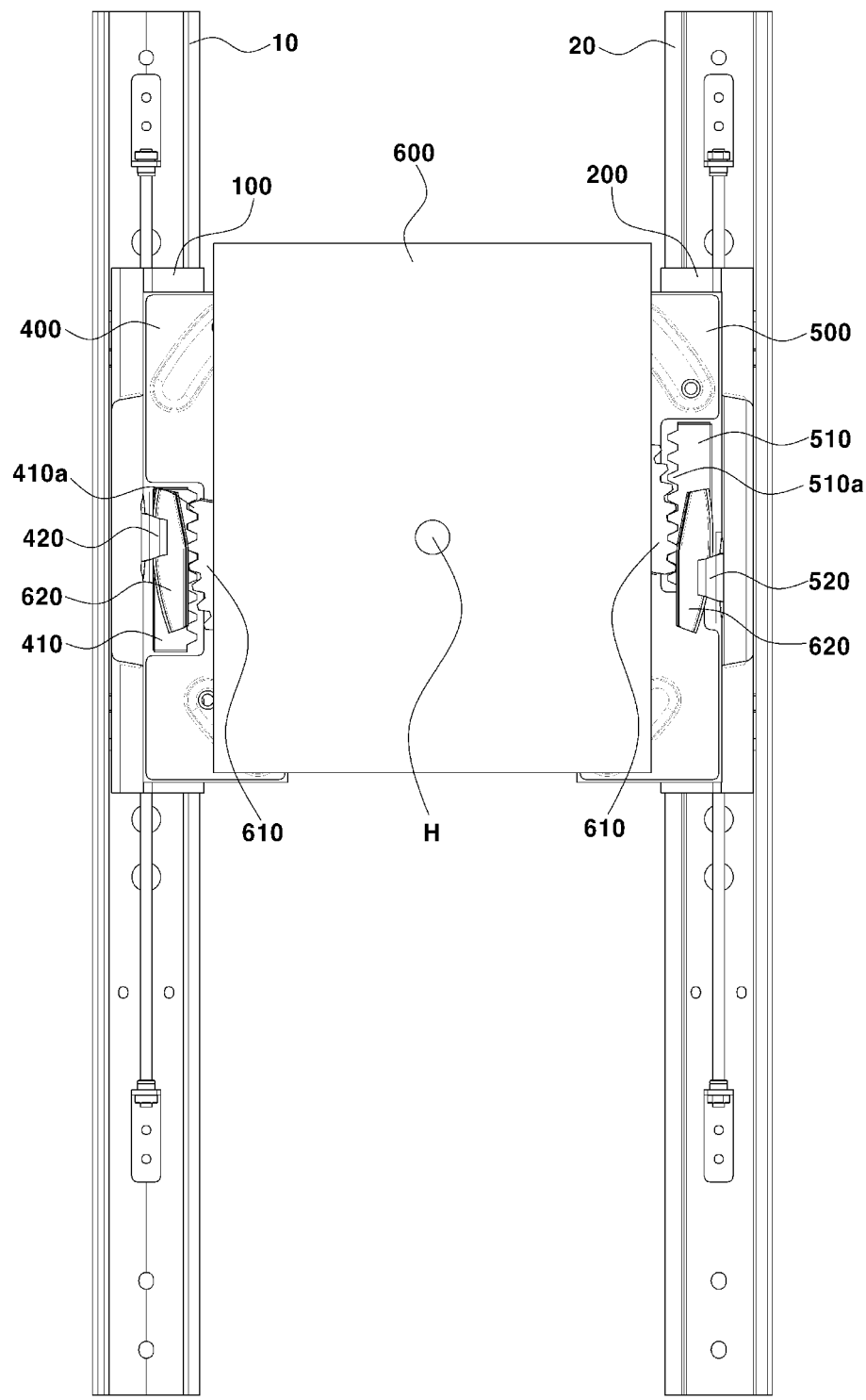
FIG. 5 is a view showing the initial position of the seat cushion of the rotary seat device for a vehicle according to the embodiment of the present invention.
Figure 6:
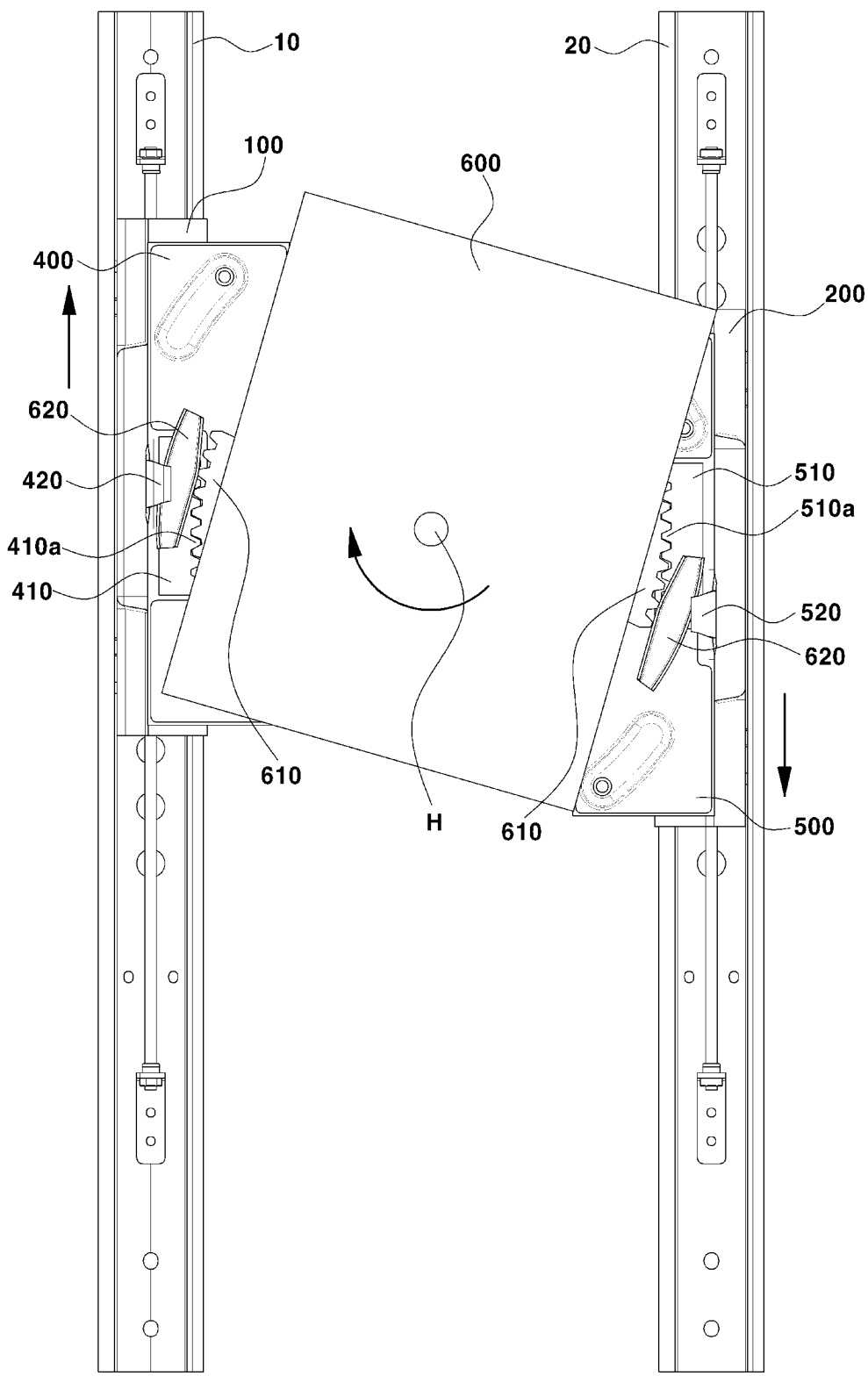
FIG. 6 is a view showing the rotational position of the seat cushion of the rotary seat device for a vehicle according to the embodiment of the present invention.

FIG. 4 is a view showing rotation of the seat cushion of the rotary seat device for a vehicle according to the embodiment of the present invention, FIG. 5 is a view showing the initial position of the seat cushion of the rotary seat device for a vehicle according to the embodiment of the present invention, and FIG. 6 is a view showing the rotational position of the seat cushion of the rotary seat device for a vehicle according to the embodiment of the present invention.

As shown in FIGS. 1 and 2, the rotary seat device for a vehicle according to the embodiment includes a first upper rail 100, a second upper rail 200, drive motors 300, a first rotation guide 400, a second rotation guide 500, and a seat cushion 600.

The first upper rail 100 and the second upper rail 200 are respectively coupled to a first lower rail 10 and a second lower rail 20, which are fixedly disposed inside a vehicle so as to be parallel to each other in order to move a seat forwards and backwards.

The first upper rail 100 and the second upper rail 200 are respectively coupled to the first lower rail 10 and the second lower rail 20 so as to be slidable in the longitudinal direction of the first lower rail 10 and the second lower rail 20, i.e. in the forward-backward direction.

The drive motors 300 are respectively provided inside the first upper rail 100 and the second upper rail 200, and are driven independently of each other.

In detail, the drive motors 300, which are respectively provided inside the first upper rail 100 and the second upper rail 200, may be controlled to be independently driven by a separate controller (not shown), and accordingly, the first upper rail 100 and the second upper rail 200 may move in mutually different directions or to mutually different positions on the first lower rail 10 and the second lower rail 20.

The first rotation guide 400 and the second rotation guide 500 are respectively coupled to the first upper rail 100 and to the second upper rail 200.

The first rotation guide 400 and the second rotation guide 500 are provided with first gears 410 and 510, which respectively have a plurality of gear teeth 410*a* and 510*a*.

The first gears 410 and 510 face each other, and are disposed at different positions separated from each other in an oblique direction. Accordingly, when the first upper rail 100 and the second upper rail 200 move in the state in which the first gears 410 and 510 are engaged with second gears 610, the seat cushion 600 is capable of rotating while forming a predetermined rotation trajectory about the center axis H thereof.

As shown in FIG. 3, the seat cushion 600 is provided with second gears 610, which are engaged with the first gears 410 and 510.

When the first upper rail 100 and the second upper rail 200 move in opposite directions, the seat cushion 600 is rotated by the first gears 410 and 510 engaged with the second gears 610.

The first rotation guide 400 and the second rotation guide 500 are provided with latching pieces 420 and 520, which protrude therefrom, and the seat cushion 600 is provided with fixing portions 620, which are caught by the latching pieces 420 and 520 (refer to FIG. 2).

Each of the fixing portions 620 has a U-shaped cross-section that is open upwards, and has an end portion that is caught by a corresponding one of the latching pieces 420 and 520. The end portion is formed in an arc shape so as to correspond to the shape of a corresponding one of the second gears 610.

Accordingly, as shown in FIG. 4, when the first upper rail 100 and the second upper rail 200 move forwards and backwards in opposite directions, the seat cushion 600 is rotated in the state in which one end portion of each of the fixing portions 620 is caught by a corresponding one of the latching pieces 420 and 520. Therefore, the fixing portions 620 guide the seat cushion 600 to rotate along a predetermined route.

Hereinafter, the operation of the rotary seat device for a vehicle according to the embodiment configured as described above will be described with reference to FIGS. 5 and 6.

When the seat cushion 600 is located at an initial position, the first gears 410 and 510, which are respectively provided at the first rotation guide 400 and the second rotation guide 500, are engaged with the second gears 610. In this case, the first gears 410 and 510 are engaged with the second gears 610 at different positions separated from each other in an oblique direction so that the seat cushion 600 is capable of rotating.

The second gears 610 are formed in the shape of an arc corresponding to the rotation trajectory of the seat cushion 600 about the center axis H. In the initial position, a relatively gently curved portion of each of the second gears 610 is engaged with a corresponding one of the first gears 410 and 510.

As described above, the first gears 410 and 510, which are provided at the first rotation guide 400 and the second rotation guide 500, are located at different positions separated from each other in an oblique direction, and the second gears 610, which are provided at the seat cushion 600, are also located at different positions separated from each other in an oblique direction so as to be engaged with the first gears 410 and 510. Due to this structure, when the first upper rail 100 and the second upper rail 200 are moved forwards and backwards in opposite directions by independent operation of the pair of drive motors 300, the seat cushion 600 is rotated 10° to 15° degrees along a predetermined rotation trajectory about the center axis H in the inward direction or the outward direction of the vehicle.

That is, when the first upper rail 100 and the second upper rail 200 are moved in opposite directions, the seat cushion 600 is rotated. For example, as shown in FIG. 6, when the first upper rail 100 is moved forwards and the second upper rail 200 is moved backwards, a relatively sharply curved portion of each of the arc-shaped second gears 610 becomes engaged with a corresponding one of the first gears 410 and 510, whereby the seat cushion 600 is rotated 10° to 15° degrees along a predetermined rotation trajectory in the clockwise direction.

In more detail, because the drive motors 300, which are controlled so as to be independently operated, are respectively provided inside the first upper rail 100 and the second upper rail 200, the first upper rail 100 and the first gear 410 thereof may be moved forwards, and the second upper rail 200 and the first gear 510 thereof may be moved backwards through independent control of operation of the drive motors 300. Accordingly, the first gear 410 moves the second gear 610, which is provided at one side of the seat cushion 600 and is engaged therewith, forwards, and the first gear 510 moves the second gear 610, which is provided at the opposite side of the seat cushion 600 and is engaged therewith, backwards, thereby rotating the seat cushion 600 to a predetermined angle in the clockwise direction from the initial position thereof.

Although the seat cushion 600 is illustrated in FIG. 6 as being rotated to a predetermined angle in the clockwise direction from the initial position thereof, the invention is not limited thereto. That is, the first upper rail 100 and the first gear 410 thereof may be moved backwards, and the second upper rail 200 and the first gear 510 thereof may be moved forwards through independent control of operation of the drive motors 300. Accordingly, the first gear 410 moves the second gear 610, which is provided at one side of the seat cushion 600 and is engaged therewith, backwards, and the first gear 510 moves the second gear 610, which is provided at the opposite side of the seat cushion 600 and is engaged therewith, forwards, thereby rotating the seat cushion 600 to a predetermined angle in the counterclockwise direction from the initial position thereof.

Although not shown in the drawings, in the conventional art, a separate rotary motor is provided to directly rotate the seat cushion 600, and the rotation axis is offset from the center of the seat cushion 600, thus increasing the radius of rotation and enabling rotation only in one direction.

In order to solve the above problems, according to the embodiment, the first upper rail 100 and the second upper rail 200 are individually moved forwards and backwards in opposite directions by the drive motors 300 in the state in which the first gears 410 and 510 are engaged with the second gears 610. Accordingly, it is possible to rotate the seat cushion 600 about the center axis H both in the clockwise direction and in the counterclockwise direction, with the radius of rotation thereof minimized.

As is apparent from the above description, according to the present invention, drive motors, which are respectively provided at a pair of rails disposed parallel to each other, are individually controlled such that the rails are independently moved forwards and backwards in opposite directions, and the two opposite sides of a seat are moved in association with the movement of the rails. Accordingly, the seat may be rotated to a predetermined angle both in the clockwise direction and in the counterclockwise direction. As a result, it is possible to improve convenience of use of the seat in the confined indoor space in an autonomous vehicle, such as for multi-party meetings and conversations, viewing the scenery, or assistance in getting in and out of the vehicle without interference with parts peripheral to the seat.

In addition, according to the present invention, in the state in which the seat cushion is coupled to the pair of rails in a gear-engagement manner, the seat cushion is rotated within a predetermined range both in the clockwise direction and in the counterclockwise direction through independent control of operation of the drive motors. Accordingly, a conventional rotary motor for directly rotating the seat cushion can be eliminated. As a result, it is possible to simplify the structure of the rotary seat device and to reduce the number of parts, the weight, and the production cost thereof.

Although exemplary embodiments of the present invention have been disclosed for illustrative purposes, those skilled in the art will appreciate that various changes may be made without departing from the principles and spirit of the invention and that all or part of the embodiments described above may be selectively combined so as to be modified into various forms. Accordingly, the technical protection scope of the present invention should be understood to be limited only by the technical idea of the appended claims.

What is claimed is:

1. A rotary seat device for a vehicle, comprising:
   a first upper rail coupled to a first lower rail so as to be movable in a forward-backward direction;
   a second upper rail coupled to a second lower rail so as to be movable in the forward-backward direction, the second lower rail being disposed parallel to the first lower rail;
   drive motors respectively provided at the first upper rail and the second upper rail;
   a first rotation guide coupled to the first upper rail;
   a second rotation guide coupled to the second upper rail; and
   the first and second rotation guides each provided with a first gear having a plurality of gear teeth, respectively,
   a seat cushion provided with second gears engaged with the first gear of the first rotation guide and the first gear of the second rotation guide, the seat cushion being configured to rotate when the first upper rail and the second upper rail move in opposite directions.

2. The rotary seat device of claim 1, wherein the second gears are formed in an arc shape so as to correspond to a rotation trajectory of the seat cushion about a center axis.

3. The rotary seat device of claim 2, wherein the first gear of the first rotation guide and the first gear of the second rotation guide are disposed so as to face each other, and are located at different positions separated from each other in an oblique direction so as to correspond to shapes of the second gears.

4. The rotary seat device of claim 1, wherein the seat cushion rotates in a clockwise direction or in a counter-clockwise direction when the first upper rail moves forwards and the second upper rail moves backwards or when the second upper rail moves forwards and the first upper rail moves backwards.

5. The rotary seat device of claim 1, wherein the seat cushion rotates 10° to 15° degrees about a center axis in an inward direction or in an outward direction of the vehicle.

6. The rotary seat device of claim 1, wherein the first rotation guide and the second rotation guide are provided with latching pieces protruding therefrom, and
wherein the seat cushion is provided with fixing portions formed to be caught by the latching pieces.

7. The rotary seat device of claim 6, wherein each of the fixing portions has a U-shaped cross-section with an end portion caught by a corresponding one of the latching pieces, and
wherein the end portion is formed in an arc shape so as to correspond to a shape of a corresponding one of the second gears.

* * * * *